United States Patent [19]

Frey

[11] Patent Number: 5,641,343

[45] Date of Patent: Jun. 24, 1997

[54] ROOM AIR CLEANER

[75] Inventor: Robert A. Frey, Westlake, Ohio

[73] Assignee: HMI Industries, Inc., Cleveland, Ohio

[21] Appl. No.: 591,741

[22] Filed: Jan. 25, 1996

[51] Int. Cl.[6] .......................... B01D 29/21; B01D 53/04
[52] U.S. Cl. ........................ 96/135; 96/138; 96/140; 96/142; 96/153; 55/276; 55/320; 55/330; 55/333; 55/357; 55/471; 55/472; 55/498; 55/514; 55/521; 55/528
[58] Field of Search ............................ 55/276, 318–320, 55/323, 330, 333, 356, 357, 385.2, 467, 471–473, 498, 502, 504, 507, 508, 514, 521, 527, 528; 96/135, 138–142, 153, 154

[56] References Cited

U.S. PATENT DOCUMENTS

| 1,921,085 | 8/1933 | Korittke | 55/276 |
|---|---|---|---|
| 2,362,933 | 11/1944 | Schaefer | 55/471 X |
| 2,394,923 | 2/1946 | Little | 55/472 X |
| 2,608,268 | 8/1952 | Gerber | 55/472 X |
| 3,426,512 | 2/1969 | Nesher | 55/467 X |
| 3,498,032 | 3/1970 | Scott | 55/521 X |
| 3,616,624 | 11/1971 | Marsh | 55/472 |
| 3,804,942 | 4/1974 | Kato et al. | 55/472 X |
| 3,925,043 | 12/1975 | Matrone et al. | 55/276 X |
| 4,121,916 | 10/1978 | Fricke | 55/472 X |
| 4,339,250 | 7/1982 | Thut | 55/467 X |
| 4,377,399 | 3/1983 | Bryson | 55/472 X |
| 4,385,911 | 5/1983 | Popeil et al. | 55/472 X |
| 4,477,270 | 10/1984 | Tauch | 55/472 X |
| 4,514,197 | 4/1985 | Armbruster | 55/385.2 X |
| 4,531,956 | 7/1985 | Howorth | 55/472 X |
| 4,627,862 | 12/1986 | Frei et al. | 55/467 X |
| 4,629,482 | 12/1986 | Davis | 55/385.2 |
| 4,687,579 | 8/1987 | Bergman | 55/498 X |
| 4,687,697 | 8/1987 | Cambo et al. | 428/201 |
| 4,737,173 | 4/1988 | Kudirka et al. | 55/472 X |
| 4,749,390 | 6/1988 | Burnett et al. | 55/467 X |
| 4,750,924 | 6/1988 | Potter | 55/472 |
| 4,810,269 | 3/1989 | Stackhouse et al. | 55/472 X |
| 4,900,344 | 2/1990 | Lansing | 55/467 X |
| 4,900,346 | 2/1990 | Lutz | 55/472 X |
| 5,141,706 | 8/1992 | Clark | 55/323 X |
| 5,240,478 | 8/1993 | Messina | 55/471 X |
| 5,290,330 | 3/1994 | Tepper et al. | 55/472 X |
| 5,358,443 | 10/1994 | Mitchell et al. | 55/502 X |
| 5,399,319 | 3/1995 | Schoenberger et al. | 55/385.2 X |
| 5,435,817 | 7/1995 | Davis et al. | 55/337 |
| 5,443,625 | 8/1995 | Schaffhausen | 55/472 X |

FOREIGN PATENT DOCUMENTS

| 2653354 | 4/1991 | France | 55/357 |
|---|---|---|---|
| 2711111 | 9/1977 | Germany | 55/502 |
| 2-187114 | 7/1990 | Japan | 55/471 |
| 4-197460 | 7/1992 | Japan | 55/472 |

*Primary Examiner*—Robert Spitzer
*Attorney, Agent, or Firm*—Vickers, Daniels & Young

[57] ABSTRACT

A portable air cleaner designed to remove fine particles and unwanted gases from a room to provide for a healthier and cleaner environment. The portable air cleaner includes a high air volume circulating design and operates quietly and efficiently. The portable air cleaner is designed to minimize the unsettling of particles which have settled out on the floor about the base of the air cleaner so as not to aggravate the particle concentration within the room environment. The portable air cleaner includes a particle filter designed to have ultra high efficiencies with respect to particle removal. Disposed coterminous to the particle filter to remove unwanted gases from the filter air to provide for improved cleaner and healthier environment.

40 Claims, 5 Drawing Sheets

ROOM AIR CLEANER

This present invention relates to the art of air filter systems and more particularly to a portable room air cleaner. The invention is particularly applicable to a portable canister type air cleaner and will be described with particular reference thereto; however, the invention has much broader applications and may be used to filter air in other environments by employing the novel air filtering arrangement as contemplated in the present invention.

BACKGROUND OF THE INVENTION

As more and more people move to urban environments, there is an ever increasing need to provide a clean air environment at home and in the work place. In urban areas, where polluting levels sometimes exceed maximum values set by the EPA. The need for a clean air environment becomes even more apparent. In view of the posed hazards of these excessive pollutants, the public has demanded a means for removing such pollutants so as to provide a healthy environment for both living and working. Furthermore, many of these particles in the air can act as irritants and/or increase or aggravate people's allergies. Air born pollutants can also contribute to respiratory infections and illnesses which can be hazard to individuals with respiratory problems. Particles in the air may create problems with burning eyes, act as nose and throat irritations, contribute to headaches and dizziness and can result in coughing and sneezing. Furthermore, these particles may include various types of spores, bacteria, viruses or harmful particles which may cause serious illness to a person.

In an effort to reduce such irritants and/or harmful particles, many family homes and offices have incorporated a central filtering system to remove particles entrained in the air. Unfortunately, these systems are very expensive and/or do not remove many of the small particles which can be the most hazardous and irritable to persons such as spores, bacteria, virus and some harmful chemicals. Typically, these filtering systems only remove about 300,000 particles out of about 20 million particles which flow into the filter medium. The small particles which make up a majority of the particles in the air freely pass through conventional filters.

Specialized filters have been developed to remove very small particles. Such filters are known as HEPA filters which stand for High Efficiency Particle Air Filters which, by government standards, are filters with a minimum efficiency of 99.97%. The industry defines HEPA filters as those filters which are efficient in removing 99.97% of the air born particles of the size of 0.3 micron or larger. Such filters are used in ultra clean environments such as in a laboratory, in electronic and biologically clean rooms, in hospitals and the like. These filters have recently been incorporated in air filters for business and individual use.

In U.S. Pat. No. 4,629,482, a portable HEPA room air purifier, is disclosed. The purifier incorporates a cylindrical HEPA filter and the filter is mounted within the filter housing having an annular discharge at its base. A centrifugal fan is incorporated in the housing to draw air through the filter and discharge air at the base of the housing. Due to the configuration of the purifier, it is necessary to space the base of the apparatus from the main housing. Such a configuration also requires that the apparatus be designed somewhat larger than some consumers may desire. The discharge of the air at the base of the unit results in the recirculation of particles which had settled out onto the floor. Such recirculation of settled particles places more particles in the room, which can increase particle irritation. The purifier does not incorporate a gas filter to remove irritable or noxious gas from the air.

In U.S. Pat. No. 5,435,817, another type of portable HEPA room air purifier is disclosed. This unit is cylindrical in shape and includes a base discharge. A centrifugal fan is incorporated to draw air into the top of the unit and discharge filtered air at the base of the unit. The unit incorporates an outer deflector wall to radially discharge air at the bottom of the unit, such that the exhaust air is channeled generally circumferentialy about the base of the unit. The discharged air at the base of the unit results in the redistribution of settled particles back into the air. The purifier is also absent any mechanism for removing unwanted gases in the air.

The efficiencies of HEPA filters are all based upon 0.3 micron size particles. Historically, it was believed that such particles were the most difficult to remove from the air. However, recent particle filtration testing has shown that particles the size of about 0.1 micron are the most difficult to remove from the air. Standard HEPA filters do not efficiently remove such small particles and allow such particles to freely pass through the filter medium. An analysis of these small particles has shown that the particles do not naturally fall out of the air, but instead maintain entrained in the air by constantly bouncing off of other particles in the air (i.e. Browning effect). These small particles also have been found to deviate from the air flow thus making such particles even more difficult to remove from the air.

In view of the foregoing, it has become necessary to overcome the physical determents of prior art portable filter structures by providing a compact portable unit which filters particles as small as 0.1 micron out of the air, filters the air without re-circulating particles which have previously settled out of the air and removes undesirable gases from the filtered air.

SUMMARY OF THE INVENTION

The invention relates to compact portable room air cleaner and will be described with particular reference thereto, however, it will be appreciated that the air cleaner can be used in general industrial levels and in other environments wherein it is desirable to remove very small particles and/or undesirable gases from the environment.

In accordance with a preferred embodiment of the present invention, there is provided a portable air cleaner which includes a housing having an inner chamber. The exterior of the housing includes an air exhaust and an air intake. The air intake is located below the air exhaust so as to draw air into the air cleaner near the base of the air cleaner and to expel filtered air at or near the top of the housing. The air being drawn into the base of the housing does not re-blow settled particles at or near the housing base back into recirculation into the room. If any settled particles are disturbed, these particles are immediately drawn into the air cleaner and filtered out of the air. The air expelled by the air exhaust at the top of the housing is distanced from the floor where settled particles exist thus the expelled air does not cause settled particles to be recirculated in the room. The air intake and air exhaust are preferably located about the complete peripheral edge of the housing so as to draw in and expel air essentially around the complete peripheral surface of the housing. This design of the air intake and air exhaust maximizes the surface area in which the air can be drawn in and expelled from the air cleaner. As a result, large volumes of air can be filtered by the air cleaner. Furthermore, the velocity of the air into and out of the air cleaner is reduced due to the large surface areas of the air intake and air exhaust. The reduced velocity of the air into and out of the air cleaner reduces problems of stirring settled particles near the air cleaner. The design of the air cleaner to both draw and expel air around the periphery of the housing allows the air filter to be positioned in various places in a room without concern for blocking the air flow into the air intake or out of the air exhaust.

A motor mechanism is located within the housing to draw air through the air intake, through one or more filters, into the inner chamber of the housing and to expel the air out through the air exhaust. The motor mechanism preferably includes an electric motor which drives a fan for creating a vacuum in the inner chamber of the housing which results in air being drawn into the air intake and through the one or more air filters. Disposed between the air intake and inner chamber is a particle filter designed to mechanically remove a wide variety of particles entrained in the air. Preferably, the particle filter is a particle filter which removes 99.97% of particles 0.3 micron entrained in the air and more preferably, removes 99.98% of particles 0.1 micron.

In accordance with another aspect of the present invention, the particle filter includes a layer of inorganic fibers supported between two layers of organic fibers which are orientated to remove essentially all particles greater than about 0.1 micron in size and at least about 99.98% of particles about 0.1 micron in size. Preferably, the filter includes randomly laid, high temperature resistant inorganic fibers which are interlocked together and disposed between an organic support fabric. The support fabric is preferably a non-woven fabric which is resilient and flexible to provide strength to the fibers especially in the transverse direction. The inorganic fibers may be attached to the support fabric by an adhesive which is preferably flexible and forms a bond between the fabric and inorganic fibers and allows the fabric and fibers to be folded or pleated. The adhesive is preferably applied in a discontinuance manner so as not to block or impair the air flow through the filter. Preferably, the adhesive does not occupy more than 40% of the lateral surface of the support fabric. The adhesive may be a conventional textile adhesive such as polyamides, ethylene vinylacetate, polyesters and polyolefins, water base adhesives and cross linking adhesives. The inorganic fibers preferably are glass fibers, metal fibers such as copper, brass, bronze, aluminum, steel or ceramic fibers; and more preferably, glass fibers or ceramic fibers.

In accordance with still another aspect of the present invention, a gas filter is used in combination with the one or more fiber filters to remove gases such as smoke, fumes, gas contaminants, or noxious gases from the filter air. The gas filter is generally positioned adjacent to the particle filter. The gas filter is preferably formed of non-woven activated charcoal matting. The gas removing filter preferably includes a layer of activated charcoal material in the form of a non-woven mat impregnated with activated carbon. The mat has a thickness of preferably less than about 1.0 inch and is more preferably a cylindrical mat structure wherein the layer of activated charcoal filtering is approximately ⅛–½ of an inch in thickness. Preferably the mat is non-woven polyester material impregnated with activated carbon. The gas filter has a normally sponge texture to maximize the surface area for the activated carbon.

In accordance with another aspect of the present invention, both the particle filter layer and the gas removing filter layer are cylindrical in shape to maximize the surface area of filtration to provide increased particle and gas removal. The filters are preferably positioned adjacent to one another thereby minimizing the area taken up by the filters and to ensure that the filters are properly positioned in the air cleaning system.

In accordance with yet another aspect of the present invention, a support mechanism is employed to maintain the one or more filters in the air cleaner in a proper position and to support the filters during the filtration of the air. The support mechanism may be incorporated into the filters themselves or may be an external mechanism such as a frame to hold the filters in place. The support mechanism is designed to support and maintain the filters in position without impairing the air flow through the filters.

In accordance with another aspect of the present invention, the air filters in the air cleaner do not cause a large pressure drop as the air passes through the filter system. The fibers in the particle filter are designed to trap particles entrained in the air as they pass through the filter and not impair the air flow through the air filters. Furthermore, the other components of the air cleaner are designed to minimize pressure drop through the air cleaner. One such component is the high volume passageway positioned between the one or more filters and the motor mechanism and is designed to minimize a pressure drop from the air flowing from the filter to the motor. The high volume passageway includes a large surface area of openings to allow the air to freely pass from the one or more filters to the motor mechanism. The low pressure drop through the filter layers enables the filters to be using relatively small air cleaning units and do not require a large motor to draw and expel the air through the air cleaner. As a result, the air cleaner can use a smaller motor so that the air cleaner can have a more compact and portable design.

The primary object of the present invention is the provision of an air cleaner which can efficiently and effectively filter out particles entrained in the air.

Another object of the present invention is the provision that the novel air cleaner is designed to have a large volume of air intake and large volume air exhaust with low air velocity into and out of the air cleaner.

Another object of the present invention is the provision that the filter in the air cleaner includes inorganic fibers which entrap particles as the particles pass into the filter.

Yet another object of the present invention is the provision that the filter element in the air cleaner can be easily changed when the filter becomes clogged or partially clogged.

Still a further object of the present invention is an air cleaner which includes using a particle element in combination with a gas removing filter so that the filters remove both particles and unwanted gases from the air by the air cleaner.

In accordance with another object of the present invention, the particle filter and the gas filter are disposed in a coterminous relationship to one another and supported by support structure.

In accordance with another aspect of the present invention, the air cleaner is designed to minimize the air pressure drop throughout the air cleaner thereby reducing the need for a large motor to draw in and expel air from the air cleaner.

It is another object of the present invention to provide an air cleaner wherein the discharge of the air is generally radially outward from the entire periphery of the air cleaner housing so as to uniformally distribute filtered air.

It is another object of the present invention to provide an air cleaner wherein air is drawn radially inwardly from the entire periphery of the unit near the base of the unit and the air is discharged outwardly about the entire periphery of the unit above the air intake.

In accordance with yet another object of the present invention, the air cleaner discharges filtered air without disturbing and/or causing settled particles to be recirculated in an environment.

It is still another object of the present invention to design a compact and portable air cleaner which can be easily moved to different rooms by a user.

These and other objects and advantages will become apparent to those skilled in the art upon reading the following description taken together with the accompanying drawings.

BRIEF DESCRIPTION OF THE DRAWINGS

Reference is now made to the drawings, which illustrate various embodiments that the invention may take in physical form and in certain parts and arrangement of parts herein.

PREFERRED EMBODIMENTS OF THE INVENTION

Figure 1:
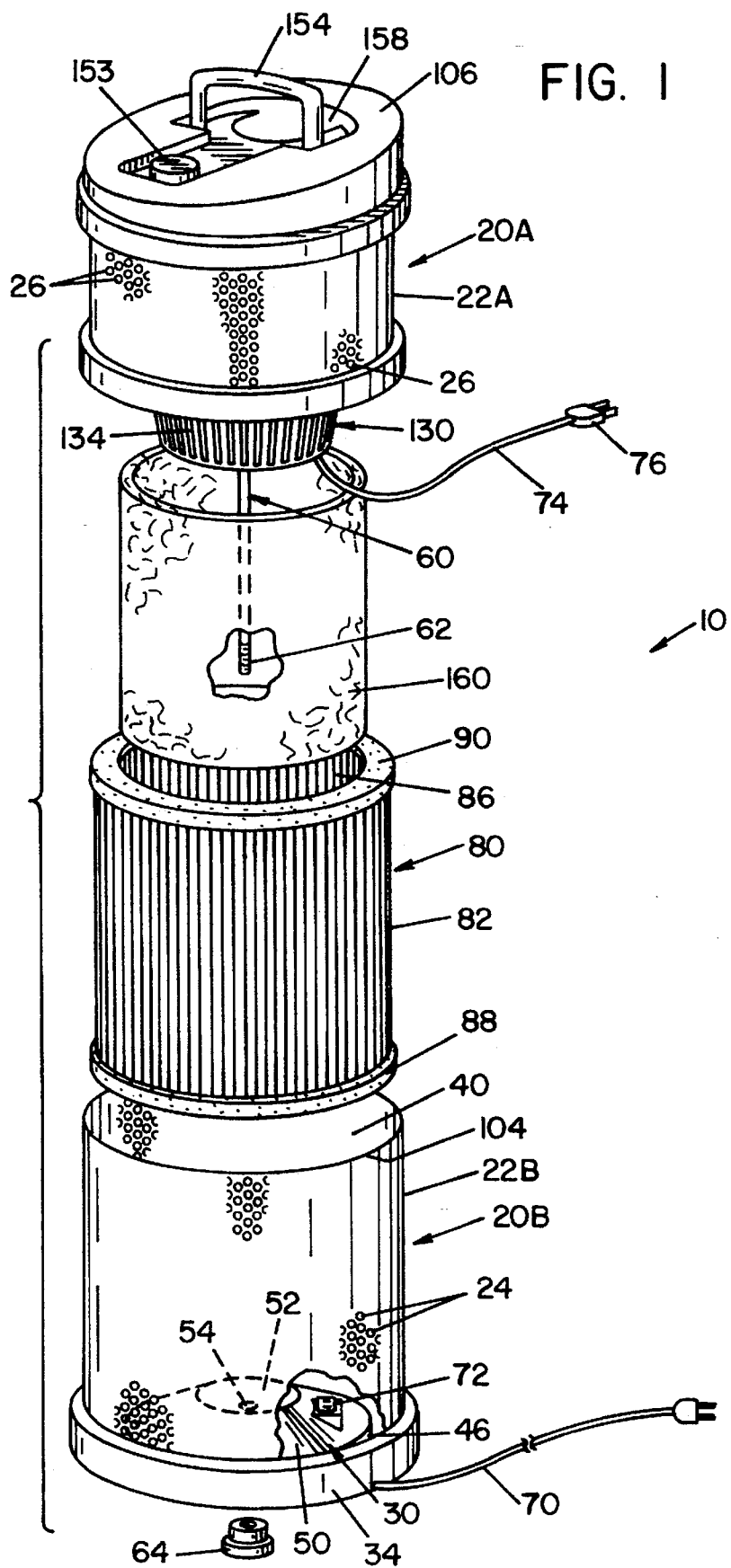
FIG. 1 is an assembly view of the room air cleaner of the present invention.

Referring now to the drawings wherein the showings are for the purpose of illustrating the preferred embodiment of the invention only and not for the purpose of limiting the same, FIG. 1 illustrates a portable air cleaner 10. Air cleaner 10 includes a housing made up of an upper housing 20A and a lower housing 20B. Both the upper and lower housings are preferably cylindrically shaped. Lower housing peripheral surface 22B includes air intake 24. Air intake 24 is preferably positioned about the complete peripheral surface of lower housing 20B and includes multiple holes or slots in peripheral surface 22B. The size of the slots or holes in air intake 24 are preferably sized such that a user cannot insert his or her fingers into the slots or holes and damaging the interior of air cleaner 10.

Figure 2:
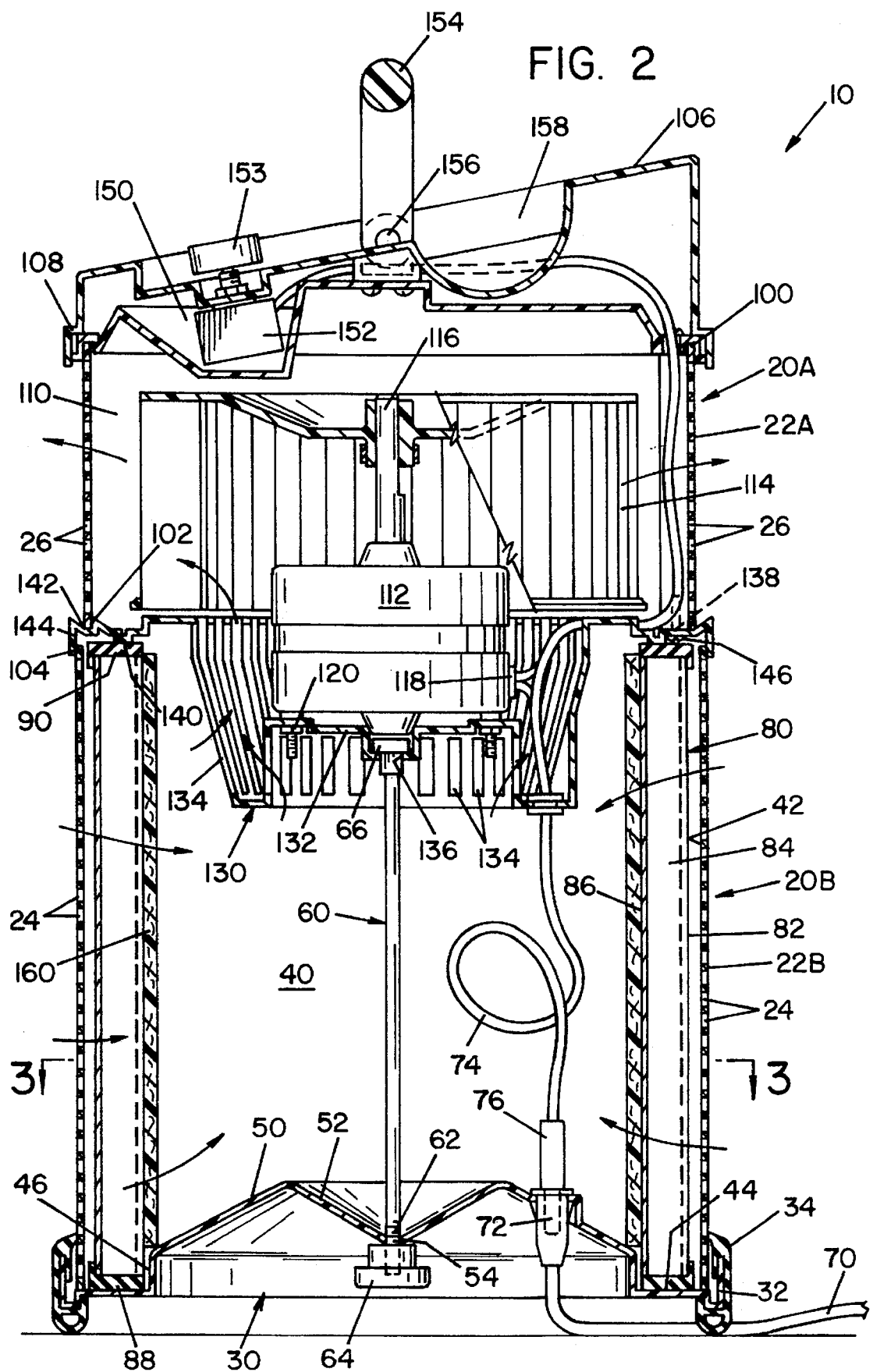
FIG. 2 is a cross-sectional view of the assembled air purifier of the present invention.

Air intake 24 is positioned on the lower part of air cleaner 10 so as to draw in the air at or near the base of air cleaner 10. This positioning of air intake 24 is opposite that of prior art air cleaners wherein the air exhaust was located at or near the base of air cleaner 10. The prior art air cleaners caused particles which had settled onto the floor at or near the base of the air cleaner to be recirculated into a room due to the air flow from the air exhaust. In the present invention, air cleaner 10 reduces and/or prevents the recirculating of settled particles by intaking air at or near the base of air cleaner 10 and expelling the filtered air at or near the top of the air cleaner. Any particles which are disturbed by the air flow into the air cleaner will be drawn into the air cleaner and filtered by the air cleaner. The positioning of the air intake about the complete peripheral surface of the lower housing results in a larger surface area for the air flowing into the air cleaner resulting in a high volume of air drawn into the air cleaner without creating high velocities of air into the air cleaner. The velocity reduction of the air into the air cleaner reduces and/or prevents problems associated with disturbing settled particles about the air cleaner are significantly reduced. Mounted onto lower housing base 30 is a bumper 34. Bumper 34 is connected to the lower housing by bumper leg 32 which is positioned outside of the peripheral surface 22B adjacent to base surface 44 as illustrated in FIG. 2. Bumper 34 is preferably made up of a plastic or rubber material which is designed to absorb vibration and noise thereby providing for a quiet operation of air cleaner 10.

Referring again to FIGS. 1 and 2, upper housing 20A includes an upper housing peripheral surface 22A which incorporates air exhaust 26. Air exhaust 26 is positioned completely about the peripheral surface 22A. The holes or slots of the air exhaust are similarly sized as that of the air intake. The positioning of the air exhaust about the complete peripheral surface of the upper housing increases the surface area of the openings of the air exhaust thereby allowing a large volume of air to be expelled from air cleaner 10 without creating high air velocities. As discussed above, high velocity air can cause settled particles to be inadvertently recirculated into a room. The positioning of air exhaust 26 on upper housing 20A also distances the air exhaust from the base of air cleaner 10 thereby significantly reducing the chance that the filtered air exiting air cleaner 10 will disturb any particles which have settled on a floor near air cleaner 10.

As best shown in FIG. 2, lower housing 20B includes an inner chamber 40. Inner chamber 40 is preferably cylindrical in shape and has a generally constant cross-sectional diameter along the longitudinal axis of the inner chamber. Inner chamber 40 includes a side wall 42 which defines the interior surface of air intake 24. The interior chamber also includes a base surface 44.

A filter ledge 46 is positioned on base surface 44 and spaced from side wall 42. The filter ledge extends about base surface 44 of inner chamber 40. Filter ledge 46 preferably is mounted at an angle perpendicular to base surface 44 and essentially parallel to side wall 42.

Extending from the top of filter ledge 46 is air deflector 50. Air deflector 50 extends at some non-perpendicular angle from filter ledge 46 toward the interior of inner chamber 40. The air deflect also extends completely about the central axis of the inner chamber. The slope surface of air deflector 50 causes the air entering inner chamber 40 to be directed upwardly and toward air exhaust 26. Air deflector 50 extends into the interior of inner chamber 40 until it contacts motor support guide surface 52. Guide surface 52 extends toward the central axis of inner chamber 40 at a downward angle. Guide surface 52 extends uniformally about the central axis of inner chamber 40 thereby forming a conical surface near the central axis of inner chamber 40. Guide surface 52 is designed to guide threaded surface 62 of motor support 60 toward support hole 54 located at the central axis of inner chamber 40. As illustrated in FIG. 2, filter base surface 44, air deflector surface 50 and guide surface 52 define the complete base of lower housing 20B.

As best shown in FIGS. 1 and 2, particle filter 80 is positioned between side wall 42 and filter ledge 46. Preferably, particle filter 80 is cylindrical in shape and has a thickness which is less than or equal to the distance between side wall 42 and filter ledge 46. As shown in FIG. 2, filter ledge 46 maintains particle filter 80 in position so that the particle filter does not move as air enters intake 24 and passes through particle filter 80. Particle filter 80 is positioned on top of filter support 88. The filter support and the filter ledge maintain the bottom edge of particle filter 80 in proper position with respect to the base of lower housing 20. As shown in FIG. 2, filter support 88 provides a small space between filter outer layer 82 and side wall 42. This small space ensures that particle filter 80 is not damaged during the operation of a filter. Filter support 88 also acts as an air seal to prevent air from flowing under the particle filter 80 and into the interior of inner chamber 40 without being filtered.

At the top of particle filter 80 is a filter seal 90. This filter seal works in conjunction with filter support 88 to maintain particle filter 80 in its proper position within inner chamber 40 throughout the longitudinal axis of the inner chamber. Filter seal 90 creates a small space between filter outer layer 82 and side wall 42. Filter seal 90 also prevents air from traveling about the top of particle filter 80 and into the interior inner chamber 40 without prior to being filtered.

Figure 3:
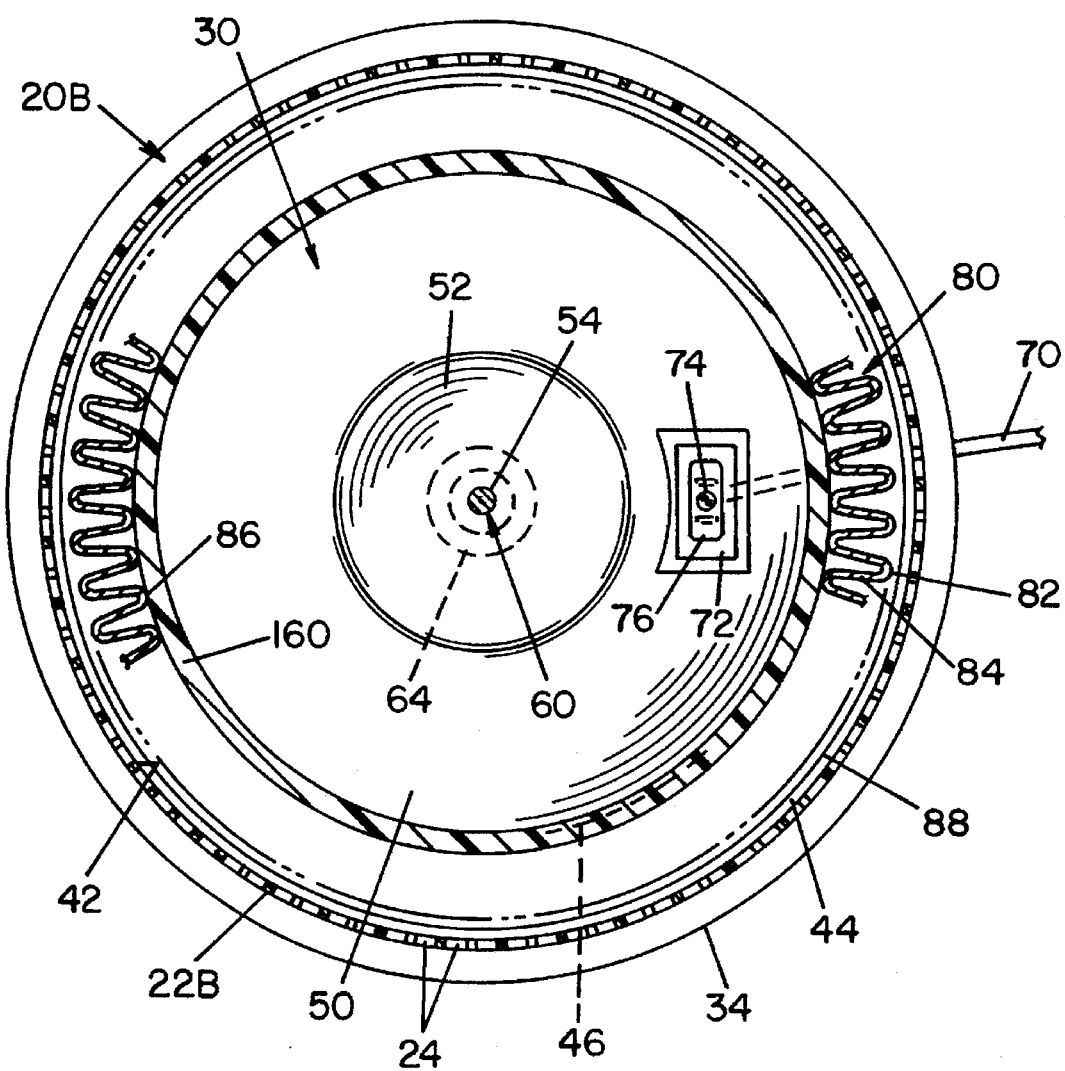
FIG. 3 is a cross-sectional view taken along line 3—3 of FIG. 2.

Particle filter 80 is preferably an HEPA filter which is designed to remove at least 99.97% of particles entrained in the air which are about 0.3 microns in size and preferably removes at least 99.98% of particles about 0.1 micron in size. The particle filter is preferably a composite filter which is suitable for use in high temperature and high stress environments. The composite material preferably includes randomly oriented high temperature resistant inorganic fibers 84 interlocked together. Preferably, these inorganic fibers are supported on an organic fiber fabric surface 82 and applied to such surface by an adhesive to maintain the inorganic fibers on the organic fiber fabric. The transverse thickness of the fabric and fibers is preferably about 0.005 inches to 1 inch thick. The particle filter is designed to be sufficiently flexible that it may be folded or pleated without breaking. As shown in FIG. 3, the particle filter is preferably a pleated filter to maximize the surface area of the filter to improve the efficiency of particle removal.

Preferably, the inorganic fibers are small glass fibers. The outer layer 82 and inner layer 86 of particle filter 80 are preferably non-woven fabrics which are high temperature resistant and flexible to provide strength to the particle filter in the transverse direction. Preferably, fabric 82 is a spunbonded non-woven polyester support fabric which has a high filter efficiency. The support fabric has a high efficiency of particle removal and is designed to remove the majority of particles 8–10 microns or larger. Preferably, each organic fiber support is 3–25 mils thick and has a particle efficiency for 8–10 micron particles of greater than 70%. The fiber support is also designed to be permeable to air so as not to cause an extremely large pressure drop. Preferably, the air permeability of the organic layer is about 200–1500 cfm/fg$^2$ @ 0.5" H$_2$O. The fiber support has a weight of about 0.25 to 10 ounces per square yard. The organic fiber support shown in FIG. 3 is a spunbonded nonwoven polyester straight fiber filter having a base weight of about 0.4–2 oz/yd$^2$ and more preferably 0.4–0.75 oz/yd$^2$, a thickness of about 5–7 mils, an air permeability of about 850–1400 cfm/fg$^2$ @ 0.5" H$_2$O, a particle removal efficiency of about 72–90% for particles 8–10 microns in size, and a fiber diameter of about 15–25 microns and preferably about 20–23 microns. The relatively large fiber diameter is designed to remove very small particles by impaction, the phenomena of the small particles colliding with a fiber and permanently adhering to the fiber.

The adhesive which applies the inorganic fibers to the inner and outer organic support layer is preferably an organic adhesive which flexibly and adhesively bonds the layers to the inorganic fibers. The adhesive is discontinuously applied throughout the filter inner or outer layer so as not to adversely affect the air flow through the particle filter. Preferably, the adhesive is a thermal plastic adhesive such as polyamides, ethylene vinyl acetate, polyesters and polyolefins. The adhesive is applied at a very thin film and covers not more than about 40% of the total surface area of the filter inner and outer layer. The adhesive may be disposed on the inner and outer layer and a constant or random pattern.

Figure 5:
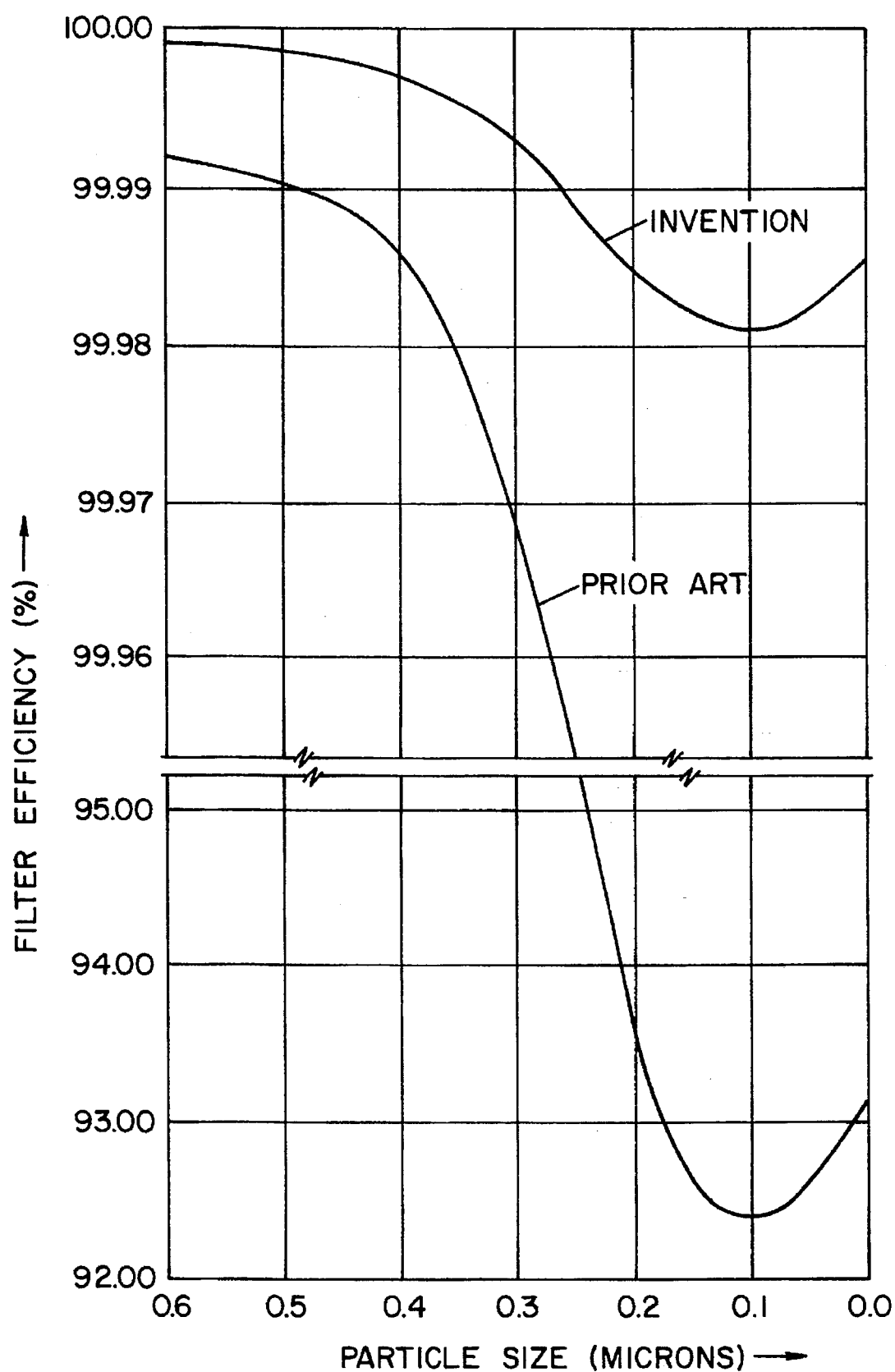

The inorganic fibers within particle filter 80 which are disposed between the inner and outer organic support layer are preferably glass and/or ceramic fibers. The dimensions of these inorganic fibers can vary widely from diameters as low as sub-micron size to up to 40 microns in diameter and have a length of 10 denier or more in length to as little as several thousandths of an inch in length. Preferably, the inorganic layer illustrated in FIG. 3 is a nonwoven glass microfiber layer which is pleated. The base weight of the glass fiber layer is about 50–80 g/m$^2$ and preferably 70–75 g/m$^2$, a particle removal efficiency of at least 99.985% for particles about 0.3 microns in size, and has a pressure drop of about 15–50 mm at 32 LPM/100 cm$^2$ and preferably 28–32 LPM/100 cm$^2$. By pleating the particle filter, very high filter efficiencies are achieved. Surprisingly, it has been found that the combination of the organic and inorganic filters achieve an extremely high particle removal efficiency for particles of a size of about 0.1 micron. Filter efficiencies of at least about 99.98% for particles 0.1 micron in size have been repeatedly achieved. These particle removal efficiencies are substantially greater than past HEPA filters. FIG. 5 illustrates the particle removal efficiencies of the filter compared to standard HEPA filters. Furthermore, the combination of an organic filter layer with an inorganic layer has achieved the extremely high filter efficiencies without cause extreme pressure drops through the filter medium. The filter combination utilized produces surprisingly high particle removal efficiencies verses the pressure drop through the filter. This filter combination overcomes the past limitation of having very high pressure drops for high particle removal efficiencies.

As shown in FIGS. 1 and 2, air cleaner 10 includes a gas filter 160 positioned coterminous to inner layer 86 of particle filter 80. Carbon filter 160 is preferably cylindrically shaped and is formed of a layer of non-woven activated charcoal matting. The activated charcoal is preferably impregnated into the non-woven mat. The mat preferably has a thickness of less than about 1 inch and is preferably no more than about ⅛–½ of an inch in thickness. The non-woven mat is preferably a non-woven polyester material that is impregnated with activated carbon. The non-woven polyester material has a cellulose configuration which significantly increases the surface area to which the air interacts the non-woven filter thereby increasing the efficiency of gas removal. The gas filter is designed to remove irritating and/or noxious gasses which freely pass through particle filter 80.

Referring again to FIGS. 1 and 2, upper housing 20A includes a motor chamber 110. Within motor chamber 110 is positioned centrifugal fan 114 which is connected to motor 112 by motor shaft 116. Centrifugal fan is designed to be rotated by motor 112 and to draw air into inner chamber 40 through air intake 24 and expel air through air exhaust 26. As the air is drawn from inner chamber 40, a vacuum is created within inner chamber 40 which causes the air outside of air cleaner 10 to be drawn through air intake 24 and through particle filter 80 and carbon filter 160. Motor 112 is preferably an electric motor which is energized by electricity traveling through motor cord 74 and into motor 112 via motor power cord inlet 118. Motor cord 74 is connected to an external power source by motor cord connector 76 connecting to power cord connector 72 on air deflector surface 50 located at the housing base 30. The power cord 70 extends from power cord connector 72 to an electrical outlet thereby providing energy or electricity to motor 112.

The speed at which motor 112 is operated can be varied by switch 152 located in switch chamber 150. Switch chamber 150 is formed by top section 106 being mounted onto air exhaust top edge 100 at top section mounting surface 108. Switch 152 may be mounted into switch chamber 150 by a nut arrangement or other mounting arrangement. Switch 152 includes a switch knob 153 which can be rotated by the user to vary the power to motor 112 to increase and decrease the motor speed. The motor is preferably designed to include an over heating reset to temporarily shut off the motor when it overheats. Such overheating can be caused by the insufficient flow of air through the air cleaner caused by clogged filters.

As illustrated in FIG. 2, motor 112 and centrifugal fan 114 are maintained in motor chamber 110 by motor guard 130. As best illustrated in FIG. 2, motor 112 rests upon guard base 132 and is further supported by motor support 60 which extends from motor 112 to housing base 30. Motor guard 130 includes a hole 136 which allows motor support 60 to pass through motor guard 130 and be mounted onto motor guard by support mount 66. Motor support 60 extends through housing base 30 via support hole 54 in guide surface 52. Motor support 60 is secured at the housing base 30 by screwing on support knob 64 onto thread surface 62 of motor support 60 as illustrated in FIG. 2.

As best illustrated in FIG. 2, motor guard 130 is mounted to upper housing 20A by inserting guard connector 146 through mount hole 138. The guard connectors are preferably screws. Motor guard 120 is connected to the base of motor 112 by nut and bolt arrangement 120. Motor guard 130 includes an air seal surface 140 which contacts filter seal 90 to form an air seal between upper housing 20A and lower housing 20B. Motor guard 130 also includes an upper housing seal surface 142 which seals bottom edge 102 of upper housing peripheral surface 22A with motor guard 130. Motor guard 130 further includes a lower housing seal surface 144 which is designed to be slidably engagable about lower housing peripheral surface 22B and air intake top edge 104. Sealing surfaces 142 and 144 on motor guard 130 effectively seal the upper housing 20A and lower housing 20B together when air cleaner 10 is fully assembled.

Figure 4:
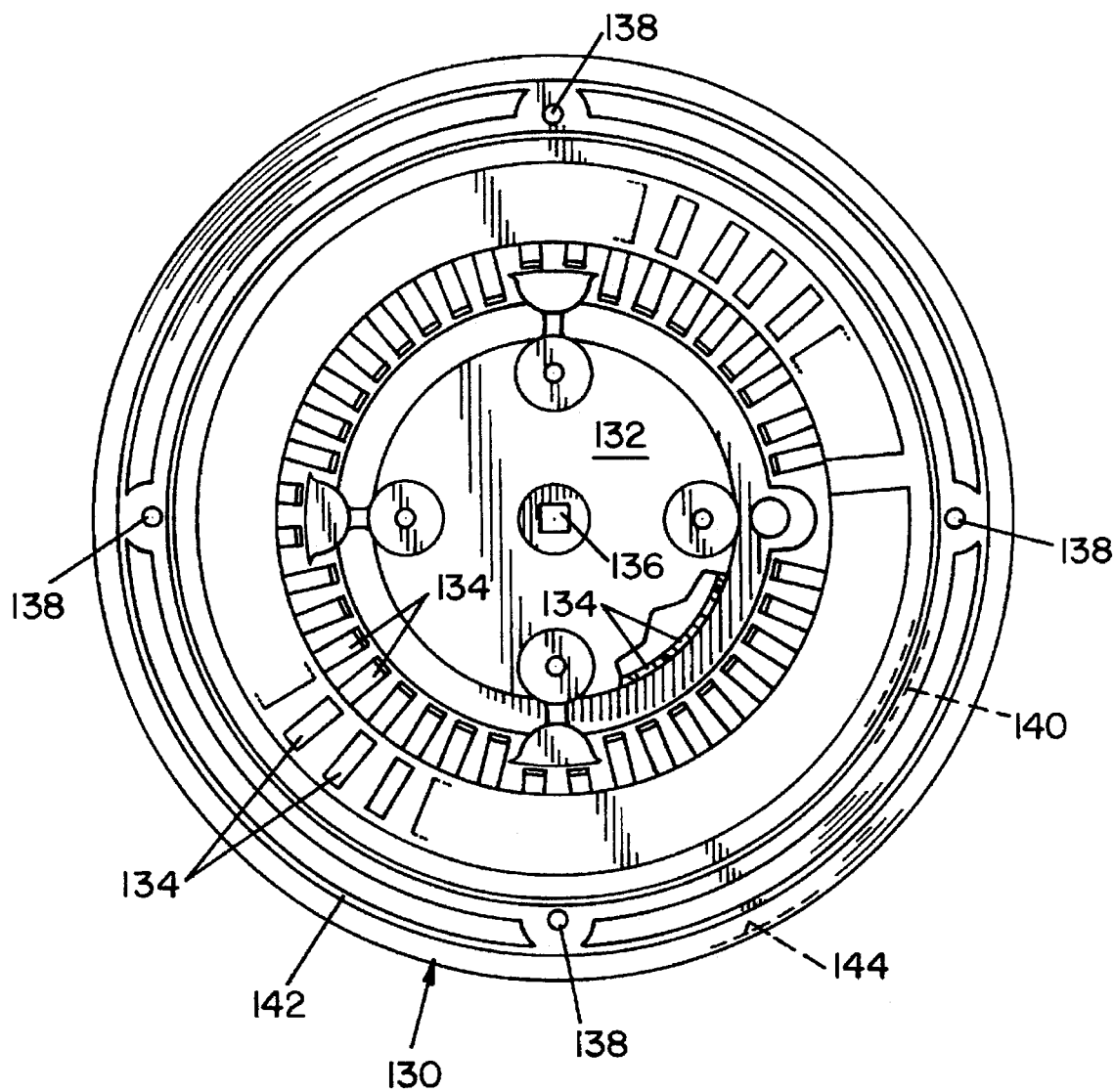
FIG. 4 is a detached plan view of the high volume air passageway of the present invention; and, FIG. 5 is a graphical representation of particle removal efficiencies of the present invention and prior art air filters.

Motor guard is designed to mount motor 112 into upper housing 20A as described above and to provide a sufficient air flow access from inner chamber 40 to motor chamber 110 so as to minimize the pressure drop between the two chambers. As illustrated in FIG. 2, a space exists between motor 112 and filters 80 and 160. The space allows the filtered air to flow between inner chamber 40 and motor chamber 110. Motor guard 130 is mounted between the space to prevent a user from freely accessing the motor and fan in the motor chamber. As best shown in FIGS. 2 and 4, narrow air slots 134 are positioned throughout motor guard 130 to preferably provide a slot space surface area which is at least equal to the cross-sectional surface area of the space between motor 112 and filters 80 and 160. To increase the slot space surface area, motor guard extends from the base of upper housing 20A into inner chamber 40 when the air cleaner is fully assembled as shown in FIG. 2.

A handle 154 is mounted onto top section 106 so that a user can conveniently move air cleaner 10 to various locations within a room or building. Handle 154 is mounted to top section 106 by handle mount 156 which allows handle 154 to pivot on top section 106. A handle slot 158 is provided in top section 106 such that the handle may be pivoted downwardly into the slot to maintain the handle in a secure position.

The steps of changing particle filter 80 and/or gas filter 160 will now be described. Air cleaner 10 is designed such that the filters within the air cleaner can be conveniently and easily removed and replaced to ensure that the air filters are properly removing particles and gases entrained in the air at the desired efficiency. As discussed above, an operator activates air cleaner 10 by rotating switch knob 153 on switch 152 into an "on" position thereby energizing motor 112 which in turn causes centrifugal fan 114 to begin to rotate. The speed of rotation of centrifugal fan 114 may be adjusted by switch 152. Air cleaner 10 is turned off by the operator rotating switch knob 153 into the off position. The filters within air cleaner 10 are easily removed by the operator tilting air cleaner 10 on its side and removing support knob 64 from threaded surface 62 of motor support 60. Once support knob 64 has been removed from motor support 60, air cleaner 10 is tilted back upon its base. Upper housing 20A is then separated from lower housing 20B by the operator grasping handle 154 and raising upper housing 20A from lower housing 20B. The raising of upper housing 20A causes threaded surface 62 of motor support 60 to retract through support hole 54. The upper housing is completely removed from lower housing by the operator reaching into inner chamber 40 and disengaging motor cord connector 76 from power cord connector 72.

Once upper housing 20A is completely removed from lower housing 20B, particle filter 80 and gas filter 160 are easily removed from inner chamber 40 by lifting the two filters out of the inner chamber. A new particle filter 80 is then reinserted into inner chamber 40 and set into base surface 44 at housing base 30. Gas filter 160 is then inserted within particle filter 80 and coterminous to filter inner layer 86 as illustrated in FIGS. 1 and 2. Once the filters have been properly inserted into inner chamber 40, upper housing 20A is replaced on lower housing 20B. As upper housing 20A is lowered onto lower housing 20B, the operating reinserts motor cord connector 76 with power connector 72. The upper housing is continue to be lowered on the lower housing. Threaded surface 62 of motor support 60 is easily guided into support hole 54 by guide surface 52. Once threaded surface 62 has been inserted through support hole 54 and the lower housing sealing surface 144 of motor guard 130 are engaged about the peripheral surface 22B near air intake top edge 104, support knob 64 is again rethreaded onto threaded surface 62 of motor support 60. The threading of support knob 64 secures the upper housing to lower housing together.

The invention has been described with reference to a preferred embodiment and alternates thereof. It is believed that many modifications and alterations of the embodiments disclosed will readily suggest themselves to those skilled in the art upon reading and understanding the detailed description of the invention. It is intended to include all such modifications and alterations insofar as they come within the scope of the present invention.

I claim:

1. A portable air cleaner comprising a housing including a top, a bottom, an inner chamber, air intake means for drawing a high volume of air through said housing at a relatively low velocity; air exhaust means for expelling a large volume of air from the inner of said housing at a relatively low velocity; motor means for drawing air into said housing inner chamber through said air intake and expelling air from said housing inner chamber through said air exhaust; filter means disposed in said housing between said air intake and air exhaust and positioned closely adjacent to said air intake for mechanically removing at least 99.97% particles greater than 0.3 micron in size which are entrained in said air; and high volume passage means for minimizing a pressure drop between said housing inner chamber and said air exhaust, said air intake positioned at least about a majority of the periphery of said housing and generally adjacent to said housing bottom and said air exhaust means positioned at least about a majority of the periphery of said housing and above said air intake means.

2. An air cleaner as defined in claim 1, wherein said air intake means having a greater area for air intake than the area for air exhaust of said air exhaust means.

3. An air cleaner as defined in claim 1, wherein said filter means includes a filter medium for particle filtration, said filter medium including support layer means comprising organic fibers and a primary filter layer comprising fibers selected from the group consisting of glass fibers, ceramic fibers and mixtures thereof, said support layer means designed to support said primary filter layer.

4. An air cleaner as defined in claim 3, wherein said particle medium is pleated.

5. An air cleaner as defined in claim 1, wherein said filter means includes a filter medium containing gas absorbent particles.

6. An air cleaner as defined in claim 3, wherein said gas absorbent particles are activated carbon.

7. An air cleaner as defined in claim 1, wherein said filter means includes at least two filters, one cleaner being a particle cleaner and another cleaner being a gas absorbent filter.

8. An air cleaner as defined in claim 1, wherein said housing includes a lower cavity and an upper cavity, said lower cavity including said air intake means and said inner chamber, said upper cavity including said air exhaust means 2 an upper enclosure and said motor means mounted in said upper enclosure.

9. An air cleaner as defined in claim 8, wherein said inner chamber includes said filter means.

10. An air cleaner as defined in claim 8, wherein said lower and upper cavity are detachably mounted.

11. An air cleaner as defined in claim 10, including sealing means for preventing air from exiting said housing as said air passes between said upper and lower cavity.

12. An air cleaner as defined in claim 8, wherein said high volume passage means is mounted in said upper cavity and extends into said lower cavity.

13. An air cleaner as defined in claim 8, including motor support means extending from said lower cavity to said motor means for supporting said motor means and suspending said motor means above said lower cavity.

14. An air cleaner as defined in claim 13, including connecting means for connecting said lower cavity to said support means.

15. An air cleaner as defined in claim 14, wherein said support means is connected to said motor means, said support means and said connecting means securing said upper cavity to said lower cavity when said connecting means is secured to said support means.

16. An air cleaner as defined in claim 1, wherein said filter means removing at least 99.98% particles greater than 0.1 micron in size.

17. An air cleaner as defined in claim 1, wherein said housing bottom includes damping means for reducing noise and vibration of said housing when said motor means is activated.

18. An air cleaner as defined in claim 17, wherein said damping means is a shock absorbent bumper comprising of a material selected from the group consisting of rubber, plastic, foam and mixtures thereof.

19. An air cleaner as defined in claim 1, including air deflector means for directing air flowing through said filter means to said high volume passage means.

20. An air cleaner as defined in claim 19, wherein said air deflector means includes a sloped surface from said housing bottom, which sloped surface extends toward the interior of said housing.

21. An air cleaner as defined in claim 20, including filter securing means for maintaining said filter means in position.

22. An air cleaner as defined in claim 21 wherein said filter securing means includes a filter slot in said housing bottom and closely adjacent to said air intake.

23. An air cleaner as defined in claim 22, wherein one end of said sloped surface is positioned closely adjacent to said filter slot.

24. An air cleaner as defined in claim 1, including filter securing means for maintaining said filter means in position.

25. An air cleaner as defined in claim 24, wherein said filter securing means includes a filter slot in said housing bottom and closely adjacent to said air intake.

26. An air cleaner for removing air particles comprising a generally cylindrical housing divided into an upper cavity, a lower cavity, an air intake, a filter, an air exhaust, a high volume passageway and a motor; said upper cavity having an exterior surface, a bottom edge and an interior compartment; said lower cavity having a base, a top edge, an outer surface, an inner surface and an inner compartment, said lower and upper cavity sealed together by sealing arrangement which sealably connects said upper cavity bottom edge to said lower cavity top edge; said air intake positioned circumferentially about said lower cavity outer surface and over a majority of said lower cavity outer surface for providing multiple passageways for said air to be dram into said lower cavity inner compartment; said filter positioned in said lower cavity inner compartment and closely adjacent to said inner surface for mechanically filtering out at least 99.97% particles at least 0.3 micron in size entrained in said air drawn into said lower cavity inner compartment, said filter including a particle filter comprising of inorganic microfibers supported on organic fibers; said air exhaust positioned circumferentially about said upper cavity exterior surface and over a majority of said upper cavity exterior surface for providing multiple passageways for said air to be expelled from said upper cavity interior compartment; said high volume passage for forming a passageway between said lower cavity inner compartment and said upper cavity interior compartment, said high volume passageway designed to minimize a pressure drop as air travels from said lower cavity inner compartment to said upper cavity interior compartment; said motor mounted in said upper cavity for drawing air through said air intake, through said filter, into said lower cavity inner compartment, through said high volume passageway, into said upper cavity interior compartment and expelling air out said air exhaust.

27. An air cleaner as defined in claim 26, wherein said lower cavity base includes a damper for reducing noise during operation of said motor, said damper including a material selected from the group consisting of rubber, plastic, foam and mixtures thereof.

28. An air cleaner as defined in claim 26, wherein said particle filter includes pleated micro fiber glass.

29. An air cleaner as defined in claim 26, wherein said filter including a gas removing filter, said gas removing filter including activated charcoal and positioned adjacent to said particle filter.

30. An air cleaner as defined in claim 29, including an arrangement which supports said particle filter and said gas removing filter in a nested position and maintaining said particle cleaner and said gas.

31. An air cleaner as defined in claim 26, wherein said motor includes a centrifugal fan.

32. An air cleaner as defined in claim 31, wherein said high volume passageway including a cap mounted to said upper cavity, said cap having multiple narrow openings for limiting access to said centrifugal fan.

33. An air cleaner as defined in claim 26, wherein said high volume passageway including a cap having multiple narrow openings for limiting access to said motor.

34. An air cleaner as defined in claim 26, wherein said high volume passageway includes a cap mounted to said upper cavity and extending into said lower cavity inner compartment, said cap having multiple openings forming a large open surface area, said open surface area minimizing a pressure drop as said air flows from said lower cavity inner compartment into said cap.

35. An air cleaner as defined in claim 26, including a motor support extending from said base of said lower cavity to said motor designed to support said motor above said lower cavity base.

36. An air cleaner as defined in claim 26, including an air deflector designed to direct air flowing through said filter to said high volume passageway.

37. An air cleaner as defined in claim 36, wherein said air deflector includes a sloped surface from said lower cavity base.

38. An air cleaner as defined in claim 37, including an arrangement which supports and maintains said particle filter in said lower cavity base.

39. An air cleaner as defined in claim 38, wherein said support arrangement includes a filter slot in said lower cavity base and closely adjacent to said air intake.

40. An air cleaner as defined in claim 26, wherein said air intake and said air exhaust each having a surface area, said surface area of said air intake being greater than said surface area of said air exhaust.

* * * * *